March 9, 1965 — A. L. LEE ETAL — 3,172,510
CABLE REELING MECHANISM
Filed Aug. 30, 1962 — 6 Sheets-Sheet 1

INVENTORS
ARTHUR L. LEE
ARTHUR B. COVAL
BY
THEIR ATTORNEY

INVENTORS
ARTHUR L. LEE
ARTHUR B. COVAL
BY Stanley J Price
THEIR ATTORNEY

INVENTORS
ARTHUR L. LEE
ARTHUR B. COVAL
BY Stanley J Price
THEIR ATTORNEY

March 9, 1965

A. L. LEE ETAL 3,172,510

CABLE REELING MECHANISM

Filed Aug. 30, 1962

INVENTORS
ARTHUR L. LEE
ARTHUR B. COVAL
BY
*Stanley J. Price*
THEIR ATTORNEY

March 9, 1965

A. L. LEE ETAL 3,172,510

CABLE REELING MECHANISM

Filed Aug. 30, 1962

INVENTORS
ARTHUR L. LEE
ARTHUR B. COVAL

BY Stanley J Price

THEIR ATTORNEY

United States Patent Office 3,172,510
Patented Mar. 9, 1965

3,172,510
CABLE REELING MECHANISM
Arthur L. Lee and Arthur B. Coval, Columbus, Ohio, assignors to Consolidation Coal Company, Pittsburgh, Pa., a corporation of Pennsylvania
Filed Aug. 30, 1962, Ser. No. 220,384
10 Claims. (Cl. 191—12.2)

This invention relates to a reeling device and more particularly to a reeling device having a pair of reels each adapted to have a single conductor cable wound thereon.

In underground mining, the vehicle used to transport the dislodged material from a continuously advancing mining machine to a fixed conveyor means is an automotive type vehicle propelled by electric motors. Power is supplied to the vehicle through a multi conductor trailing cable connected at one end to a fixed source of power and at the other end to a cable reel rotatably secured to the frame of the vehicle. The cable reel is positioned in a compartment provided along the side of the vehicle. A drive mechanism is provided to pay out and reel in the cable on the cable reel as the vehicle, commonly referred to as a shuttle car, shuttles toward and away from the source of power.

The use of a multi conductor trailing cable to provide power for the shuttle car has many disadvantages. It is hazardous, expensive, and has a relatively short life. The multi conductor cable, if accidentally cut by a falling piece of slate or other sharp object, is a fire hazard in that both conductors are exposed and sparking or arcing across the exposed conductors may occur. The exposed conductors are an electrical hazard to the men working in the vicinity of the parted cable. At times the sheathing and insulation are worn away from the cable by rubbing or scraping the cable against a rib or side wall of the haulageway. This exposes both conductors and results in the same hazards. These hazards are further increased if the exposed conductors are reeled onto the cable reel. A fire in the cable reel compartment may occur and the vehicle may become electrically charged.

The multi conductor cable is expensive because it is especially made for underground use. The conductors are insulated from each other and encased in a special sheathing that is water proof, oil proof and fire resistant. A damaged multi conductor cable is difficult to repair. To splice a parted or damaged multi conductor cable requires isolating the conductors from each other, securing the free ends of each conductor, insulating the conductors from each other, and replacing the water proof sheathing. The replacement of the water proof sheathing includes bonding a new section of sheathing positioned over the splice to the other sheathing. Usually heat and special equipment are required for this bonding process. A multi conductor cable even if spliced properly has several disadvantages. It has lost its flexibility at the splice and its cross sectional area has increased at the splice. Frequently the cable again parts at the splice. The enlarged cross section of the cable at the splice causes the cable spooler mechanism to malfunction and results in the cable being improperly spooled on the reel.

We, by our invention, have eliminated many of the above discussed problems and hazards. We use a pair of single conductor cables in place of a single multi conductor cable. A single conductor cable is more flexible than a multi conductor cable and is, therefore, easier to wind on and off the cable reel. A pair of single conductor cables are less expensive than the specially fabricated multi conductor cable. It is also safer to use a pair of single conductor cables in that it is less likely that both cables will be damaged in such a manner that the exposed conductors will contact each other.

Briefly, our invention comprises a pair of separately driven cable reels positioned in the cable reel compartment in spaced relation to each other. The cable reels are supported on a common reel support. Single conductor cables are wound on each of the reels and are maintained in spaced relation to each other. The ends of the single conductor cables are connected to fixed conductors within the cable reel carrier by means of current collectors extending axially within the cable reel hub. The current collectors have a low rotating velocity and hence have a low wear rate. Because of this axial arrangement a substantial force can be employed to urge the rotating portion of the current collector against the fixed portion to thereby provide improved electrical conductivity therebetween. A grounding means is included in each of the reels to bypass the support bearings should the cable be shorted to the cable reel.

We have also provided a means for separately controlling the pair of cable reels in that separate hydraulic or fluid driven motors are provided for each reel. With this arrangement, should one of the cables snag on an obstruction within the haulageway, the separate hydraulic motor controls the other cable reel so that substantially the same tension is maintained on each cable.

With our invention we have been able to eliminate the intricate spooling mechanism previously required to properly spool the multi conductor cable onto the cable reel. We have found that the horizontal sheave type guide means on the vehicle guides the cable onto the reel for proper spooling.

Accordingly, the principal object of this invention is to provide a cable reeling mechanism for a shuttle type vehicle wherein a pair of single conductor cables are employed.

Another object of this invention is to provide improved current collector means for a cable reeling device.

Another object of this invention is to provide a cable reeling device which is safer and less hazardous than other known reeling devices.

These and other objects and advantages of this invention will be more completely described and distinctly pointed out in the following specification, the accompanying drawings and the appended claims.

Figure 1:
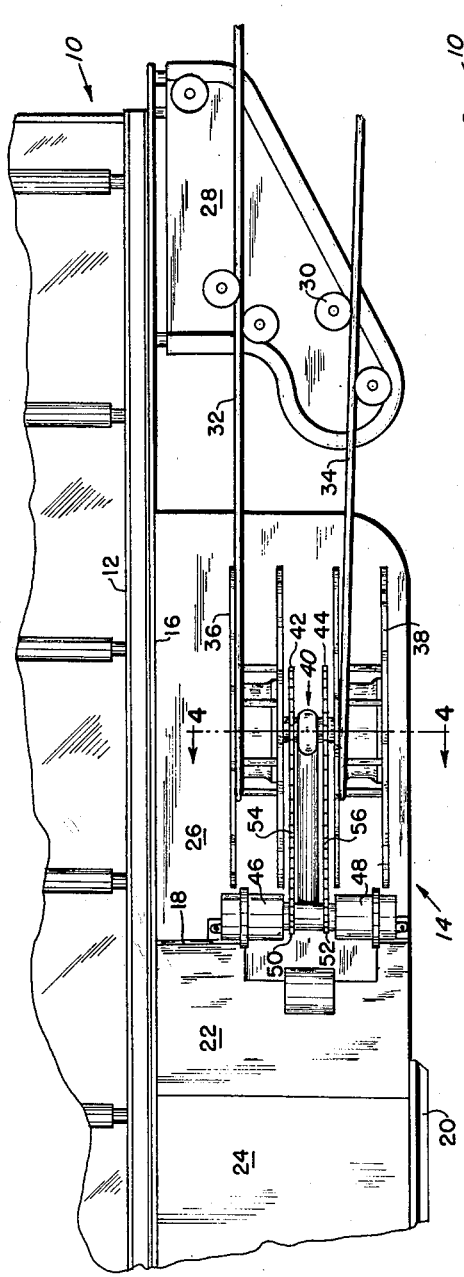
FIGURE 1 is a top plan view of a portion of a shuttle car illustrating our improved dual cable reel device and guide means.
Figure 2:
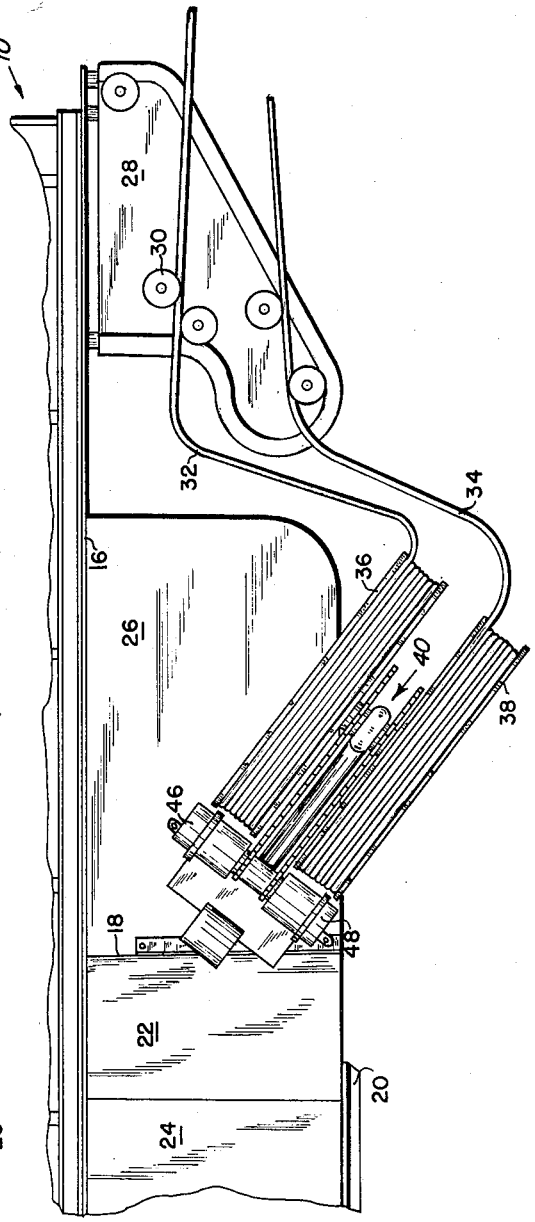
FIGURE 2 is a top plan view similar to FIGURE 1 illustrating our improved dual cable reel device pivoted outwardly to provide access to the cable reels, drive motors, and current collectors.
Figure 3:
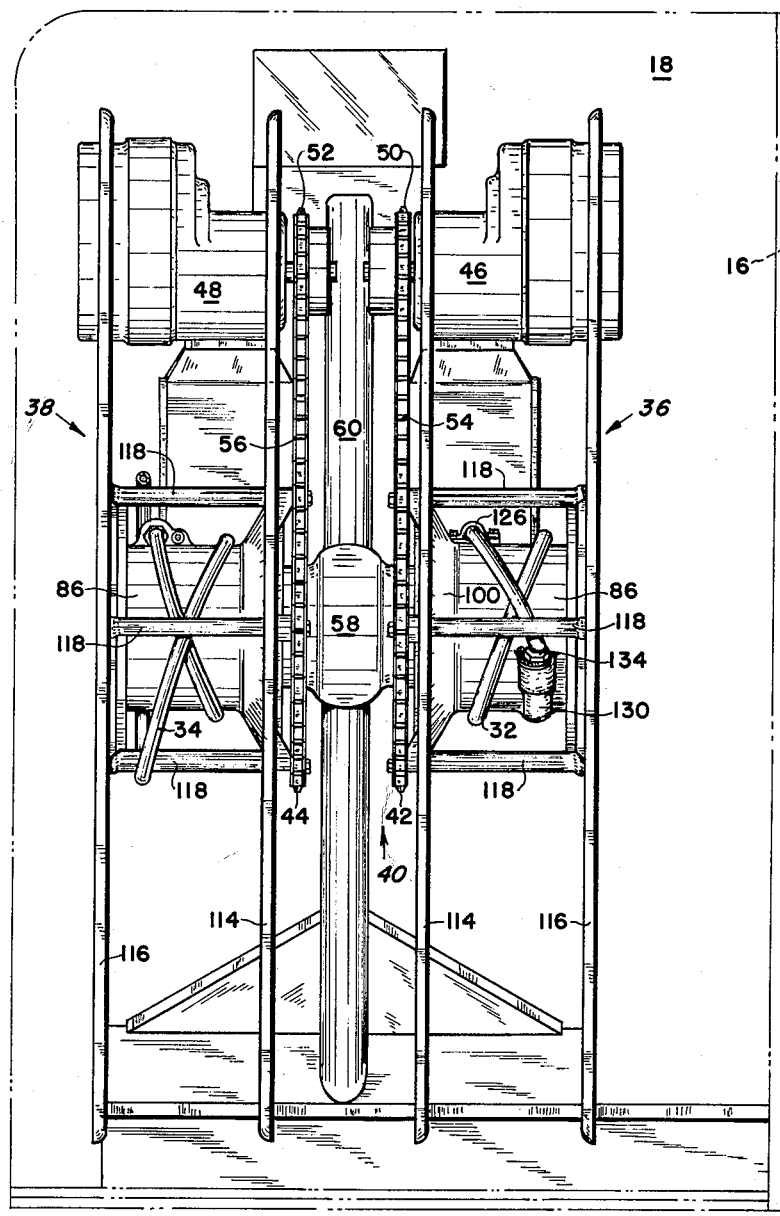
FIGURE 3 is a view in front elevation of our improved dual cable reel device.

Referring to the drawings and particularly to FIGURES 1, 2 and 3, there is shown a portion of a shuttle car that is similar to the shuttle car disclosed in Patent #2,754,015, dated July 10, 1956. The shuttle car generally designated by the numeral 10 is arranged to transport mined material from the working face to a fixed transportation means and is propelled by means of an electric motor, as is clearly described in the above patent. The shuttle car 10 has a side wall 12 with a cable reel compartment 14 extending laterally therefrom. The cable reel compartment 14 is adjacent the front or unloading portion of the vehicle 10 and has a vertical side wall 16 and a rear wall 18. The rear wall 18 serves as a fender for the wheel 20 and has an upper rearwardly extending portion 22 and a horizontal portion 24. The compartment 14 also has a floor plate 26.

The shuttle car side wall 12 has a reel guide support 28 extending laterally therefrom with a plurality of guide sheaves 30 secured thereto. The guide support 28 comprises a pair of parallel plates with the guide sheaves 30 secured therebetween. To more clearly illustrate the sheave arrangement, the top plate is not shown in FIGURES 1 and 2. A pair of single conductor cables 32 and 34 are threaded between guide sheaves 30 as illustrated in FIGURES 1 and 2 and secured at one end to cable reels 36 and 38. The cable reels 36 and 38 are positioned within cable reel compartment 14 and are supported therein in vertical spaced relation to each other by means of a cable reel support generally designated by the numeral 40. The cable reels 36 and 38 are rotatable relative to cable reel support 40 and relative to each other.

The cable reel 36 has a sprocket 42 secured thereto adjacent the cable reel support 40. Similarly, cable reel 38 has a sprocket 44 secured thereto on the opposite side of reel support 40. The reel support 40 has a pair of hydraulic motors 46 and 48 secured thereto with sprockets 50 and 52 operatively connected to their respective drive shafts. Endless chains 54 and 56 connect sprockets 42 and 44 to motor drive sprockets 50 and 52 so that cable reel 36 is independently controlled by motor 46 and cable reel 38 is independently controlled by motor 48. The connections to the hydraulic motors 46 and 48 are conventional and are not shown.

Figure 4:
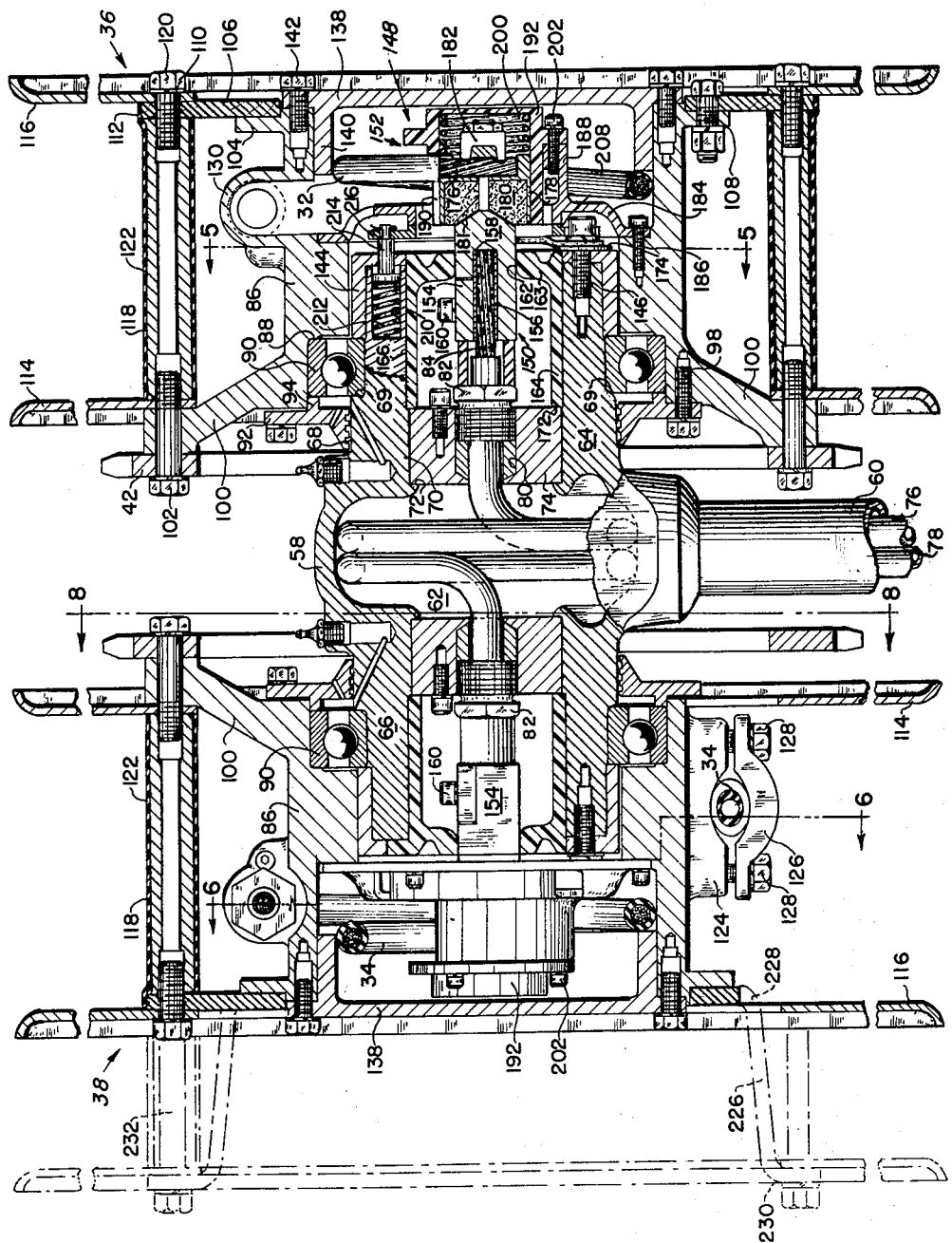
FIGURE 4 is a view in section taken along the line 4—4 of FIGURE 1 illustrating the manner in which the cable reels are secured to the reel support and the current collectors associated with each reel. A portion of FIGURE 4 is in section and illustrates the current collectors in detail.

The detailed construction of the cable reels 36 and 38 is illustrated in FIGURE 4. The reel support 40 has a reel carrier 58 with a tubular member 60 secured thereto and extending therefrom. The reel carrier 58 has a central passageway 62 with laterally extending arms 64 and 66. The arms 64 and 66 are similar in construction and only arm 64 will be described in detail. The arm 64 has a cylindrical outer wall 68 with a shoulder 69 formed thereon. The arm 64 has a central cylindrical bore 70 with an inturned annular shoulder 72. Positioned within the bore 70 and abutting the shoulder 72 is a conductor support 74. A pair of fixed conductors 76 and 78 extend upwardly through tubular member 60 into the reel carrier central passageway 62. Conductor 76 extends through a central bore 80 in conductor support 74. A retainer 82 fixedly secures the fixed conductor 76 in the bore 80. The fixed conductor 76 has a portion of the insulation removed so that wire 84 extends axially into bore 70.

The cable reels 36 and 38 are rotatably supported on the cylindrical outer wall 68 of reel carrier arms 64 and 66. The cable reels 36 and 38 are of similar construction and only reel 36 will be described in detail. Reel 36 has an annular hub member 86 which is freely rotatable on the cylindrical outer wall 68 of reel carrier arm 64. The hub 86 has an inturned shoulder portion 88. A roller bearing 90 is positioned on the cylindrical outer wall with the inner race abutting shoulder 69. The outer race of bearing 90 abuts at one end shoulder 88 on hub 86. An annular member 92 has an inwardly extending portion 94 which fixedly secures the outer race of bearing 90 relative to hub 86. The annular member 92 is secured to the hub 86 by means of bolts 98.

The hub 86 has radially extending projections 100 to which the annular sprocket 42 is secured by means of bolts 102. The hub 86 also has adjacent its other end a radially extending annular shoulder 104. An annular plate 106 abuts the annular shoulder 104 and is secured thereto by means of bolts 108. The annular member 106 has a plurality of threaded apertures 110 adjacent its outer circumferential edge 112. A pair of annular reel side plates 114 and 116 are secured to the hub member 86 in spaced relation to each other. Side plate 114 abuts the inner wall of radially extending projections 100. A plurality of tubular spacers 118 are positioned with one edge abutting plate 114 and the other edge abutting annular plate 106. Bolts 102 secure the side plates 114 to the spacer 118. Side plate 116 is positioned in overlying relations with annular plate 106 and bolts 120 extend through apertures 110 in plate 106 and secure side plates 116 to plate 106 and spacer 118. The spacers 118 have a dielectric sheathing 122 therearound.

Figure 6:
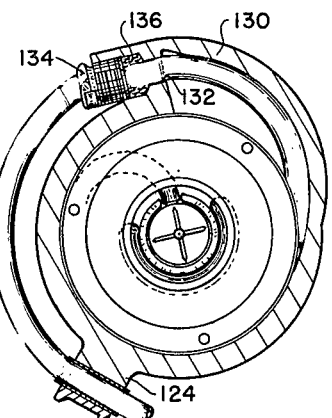
FIGURE 6 is a view in section taken along the line 6—6 of FIGURE 4 and illustrating the apparatus for securing an end of the single conductor cable to the cable reel.
Figure 8:
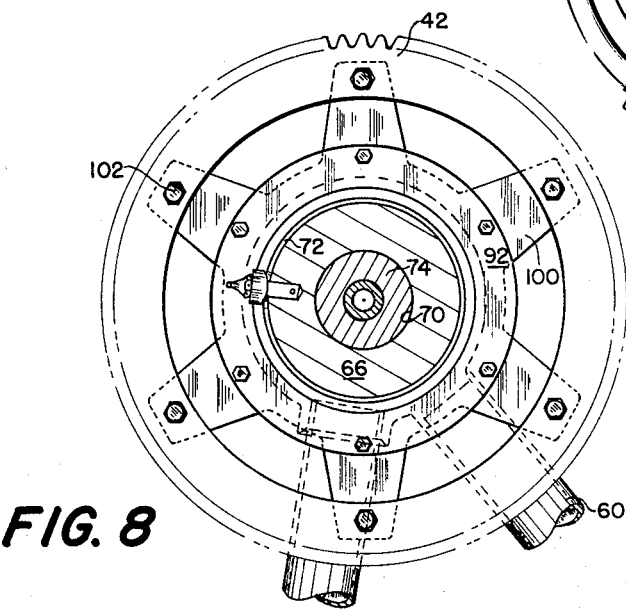
FIGURE 8 is a view in section taken along the line 8—8 in FIGURE 4 and illustrating the annular sprocket secured to the cable reel.

The hub portion 86 has a bracket 124 depending downwardly therefrom as illustrated on reel 38 in FIGURE 4 and also in section in FIGURE 6. The bracket 124 has a clamp 126 associated therewith which is arranged to clamp the conductor cable 34 to the bracket 124 by means of bolts 128. The hub 86 has a circumferential protuberance 130 with a tangential bore 132 extending therethrough (see FIGURE 6). The conductor cable 34 extends through the bore 132 and is fixedly secured therein by means of a sleeve-like bolt 134 and packing 136. The conductor 34 extends into central cylindrical bore 70 of hub 86 and is connected at its end portion to a rotary collector later described. A cover plate 138 having an inturned annular portion 140 is secured to the hub 86 by means of bolts 142 and retains the current collectors in operative relation with each other.

Figure 14:
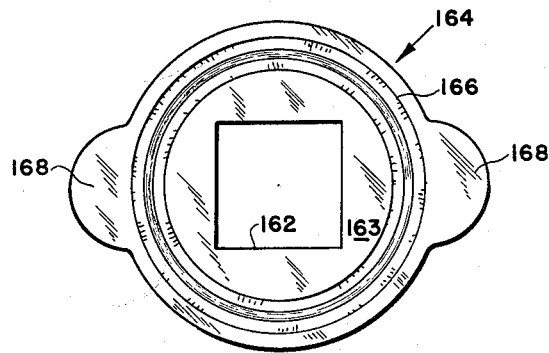
FIGURE 14 is a view in elevation of the insulator that insulates the fixed current collector from the rear support.

The inner race of bearing 90 is maintained in abutting relation with shoulder 72 by means of a cup shaped bearing retainer 144 which is positioned over the cylindrical end portion of arm 64 and maintained in position by means of bolts 146. The bearing retainer is shown in detail in FIGURES 4 and 14. With this arrangement the inner race of bearing 90 is fixedly secured to arm 64 and the outer race of bearing 90 is fixedly secured to annular hub 86 by means of annular member 92. With this construction the inner and outer races of the bearing 90 are fixed relative to the arm 64 and reel hub 86 so that there is no slippage of the races.

Figure 5:
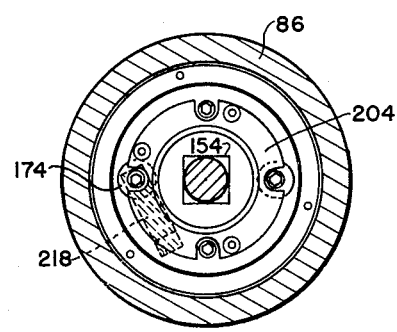
FIGURE 5 is a view in section taken along the line 5—5 and illustrating the grounding plate.
Figure 7:
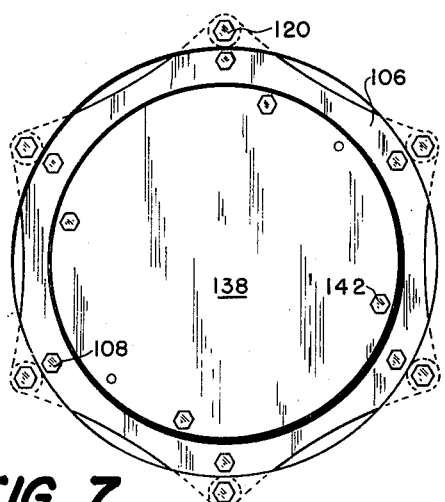
FIGURE 7 is an end view of a portion of the cable reel.

The current collector mechanism generally designated by the numeral 148 has a fixed portion 150 that is carried by the reel carrier 58 and a rotary portion 152 that is carried by the rotary cable reel 36. Hereafter the fixed and rotary portions of the current collector will be referred to as the fixed current collector 150 and the rotary current collector 152. The fixed current collector 150 has a rectangular electrode 154 with a central bore 156 and a conically shaped end portion 158. The wire 84 extends into bore 156 and is secured therein by means of bolt 160. The fixed current collector 150 extends through a rectangular aperture 162 in an end wall 163 of a cup shaped insulator 164 (see FIGURES 5 and 14). The insulator 164 has an outer cylindrical wall 166 and a pair of radially extending ears 168. The insulator 164 is positioned in bore 70 of reel carrier arm 64 with the outer cylindrical surface 166 abutting the inner wall 70. The ears 168 are positioned in mating recesses 170 in the end wall 177 of bearing retainer 144. The insulator 164 has its cylindrical end portion 172 abut conductor support 74 and is maintained in fixed relation to arm 64 by means of washer 174 and bolt 146. With this construction the fixed conductor 76 is insulated from the reel carrier 58 by means of insulator 164. The insulator 164 is constructed of a dielectric material such as fiber glass or the like. The fixed portion 150 of current collector 148 remains stationary and forms a part of the reel carrier 58. The rotary portion 152 of current collector 148 rotates with and forms a part of reel 36. The single conductor cable 32 has insulation stripped from the end portion thereof and wire 176 is clamped to a cup shaped member 178. The cup shaped member 178 has positioned therein an electrode 180 formed of graphitic material. The clamp 182 secures wire 176 to cup shaped member 178.

Figure 11:
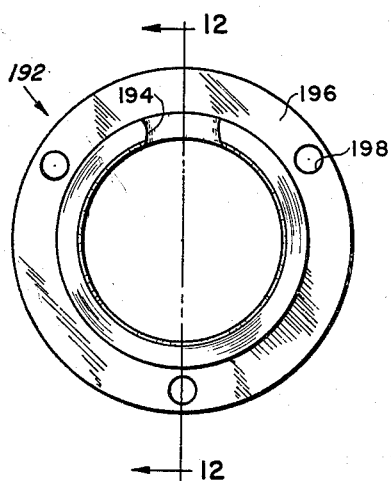
FIGURE 11 is a view in elevation of the insulator that insulates the rotary current collector from the cable reel.
Figure 12:
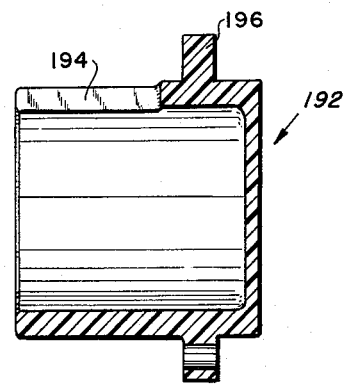
FIGURE 12 is a view in section taken along the lines 12—12 in FIGURE 11.
Figure 13:
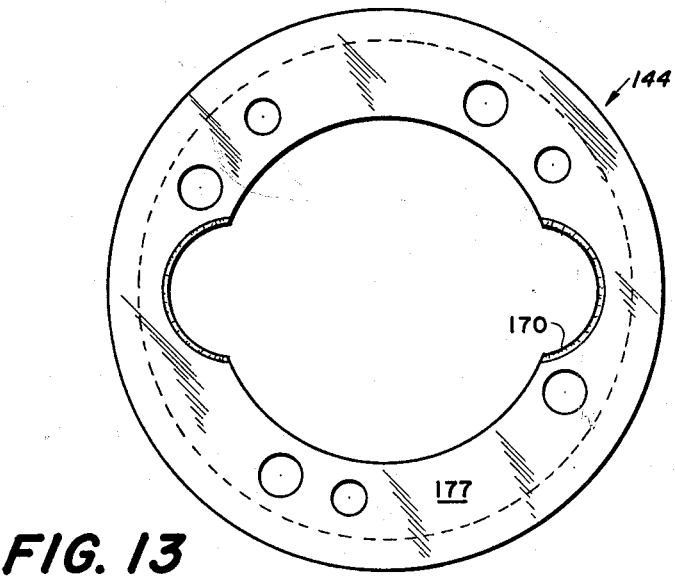
FIGURE 13 is a view in elevation of the bearing retainer.

An annular carrier or support 184 is secured to annular hub member 86 by means of bolts 186 and has an outwardly extending annular portion 188 with a longitudinal slot 190 therein. The single conductor cable 32 extends through the longitudinal slot in carrier 184. The cup shaped insulator 192 formed of dielectric material such as fiber glass or the like (see FIGURES 11 and 12) has a longitudinal slot 194 and a radial flange 196 with a plurality of apertures 198 therein. A coil spring 200 is positioned in the cup shaped portion of insulator 192 and cable 32 extends through slot 194 into the inner portion of insulator 192. Cup shaped member 178 is positioned within insulator 192 with the conical recess 181 of graphitic electrode 180 being urged against the conical end portion 153 of fixed electrode 150 by means of coil spring 200. Insulator 192 is maintained in fixed position by means of bolts 202 extending through apertures 198 into mating bores in annular contact carrier 184. With this arrangement the rotary portion of current collector 152 axially urges the rotary electrode 180 against the fixed electrode 150 to conduct current from the cable 32 to fixed conductor 76. With the axial arrangement of the current collector 148 the velocity between the respective electrodes is small and the wear rate is thus substantially reduced. It is also possible with this arrangement to exert a substantial spring pressure against the rotary electrode 180 for highly efficient transmission of current through the rotary electrode 180 to the fixed electrode 150. The replacement of the wearing parts is also simplified in that the cover plate 138 is easily and quickly removed and the graphitic electrode 180 easily replaced.

Figure 9:
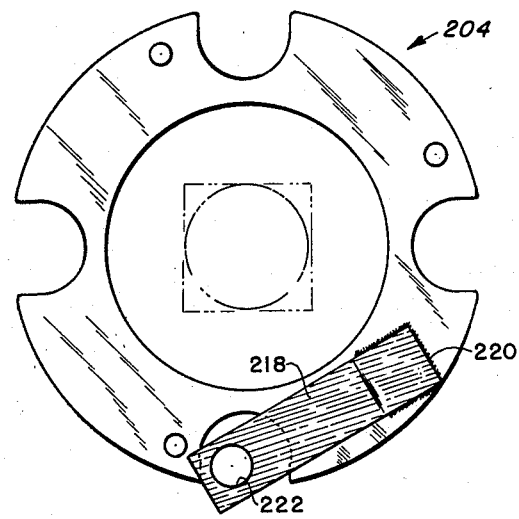
FIGURE 9 is a view in elevation of the grounding plate.
Figure 10:
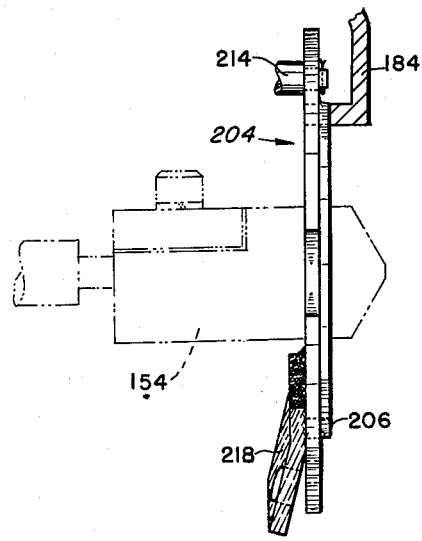
FIGURE 10 is a detail view in side elevation of the grounding plate with the fixed current collector shown in dotted lines and showing the relative position of the shunt and fixed current collector.

A grounding plate generally designated by the numeral 204 (see FIGURES 9 and 10) provides a current bypass for bearings 90 should the cable 76 ground to the reel 36. The grounding plate 204 has an annular shoulder 206 which is arranged to abut an inturned shoulder 208 on carrier 184. The laterally extending arm 64 of reel carrier 58 has a plurality of longitudinal bores 210 therein. Coil springs 212 are positioned in the bores 210. A plunger 214 is urged outwardly by means of springs 212 and has a shoulder portion 216 which abuts plate 204 to urge grounding plate shoulder 206 against support shoulder 208. A shunt 218 is soldered at one end 220 to plate 204 and has an aperture 222 adjacent its other end. The shunt 218 is connected to reel carrier arm 64 through bolt 146. Thus, if the cable 32 grounds to reel 36 the current will pass through shunt 218 instead of the spherical balls of bearings 90.

The reels 36 and 38 can be easily widened to accommodate additional cable or, if desired, a cable including a conductor and a ground wire. The apparatus to increase the width of the cable is illustrated in FIGURE 4 in dotted lines. The annular plate 106 is replaced by a cylindrical member 226 having an inturned end portion 228 and an out-turned portion 230. The spacers 118 are replaced with elongated spacers 232 and side plates 116 are secured thereto in the same manner as previously described.

With the apparatus described, a pair of single conductor cables can now be employed to supply power to the haulage vehicle. The single conductor cables are wound on dual cable reels supported by a common cable support. Each of the cable reels is controlled by a separate hydraulic motor so that the reels operate independently. The reels are provided with a highly efficient rotary collector that is axially arranged with respect to both the reel and the support. The wearing parts of the rotary collector are easily replaced and the cable may be quickly replaced on the reel. A grounding plate is also provided to bypass current around the bearings should the cable ground to the cable reel. An improved clamping arrangement is provided to secure the inner race of the bearing to the reel support and the outer race of the bearing to the cable reel hub. This arrangement eliminates the rotation of the bearing inner race on the support and the rotation of the outer race in the cable reel hub.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A cable reeling mechanism for supplying power to a vehicle comprising a tubular member secured to said vehicle frame, a reel support secured to an end portion of said tubular member and extending horizontally therefrom on opposite sides thereof, a pair of reels rotatably mounted on said reel supports on opposite sides of said tubular member and arranged to rotate in the same direction, each of said reels adapted to have a single conductor cable wound thereon, a pair of fixed current conductors extending through said tubular member and terminating in said reel supports, each of said reels having a sprocket member secured thereto adjacent said tubular member, a pair of fluid motors having drive sprockets associated therewith, said fluid motors positioned adjacent to said respective reels, a pair of endless chains drivingly connecting said reel sprockets to said fluid motor drive sprockets so that each reel is separately controlled by one of said fluid motors, a pair of current collectors positioned in said reel support on opposite sides of said tubular member, said current collectors each having a stationary portion secured to one of said fixed conductors within said reel support, said current collectors each having a rotary portion associated with one of said reels and arranged in current conducting relation with said respective current conductor stationary portion.

2. A cable reeling mechansm as set forth in claim 1 in which said current collector rotary portions are axially arranged relative to said current collector stationary portions, and means to urge said current collector rotary portions against said respective current collector stationary portions.

3. A cable reeling mechanism as set forth in claim 1 in which one of said reels includes shunt means connecting said reel to said reel support.

4. In a cable reeling mechanism as set forth in claim 1 which includes insulating means between said current collector fixed portion and said reel support, and other insulating means between said current collector rotary portion and said cable reel.

5. A cable reeling mechanism as set forth in claim 1 which includes a bearing means between said reel support and each of said cable reels, insulating means between said current collector fixed portion and said reel support, insulating means between said current collector rotary portion and said cable reel, and shunt means between one of said reels and said reel support.

6. A rotary current collector for maintaining contact between a rotary portion and a stationary portion of a conductor comprising, a fixed housing having an axial bore therethrough, a stationary conductor extending into said bore, an elongated electrode having a rectangular configuration in cross section connected to the end of said conductor, a cup shaped insulator having a side wall and an end wall, said end wall having a rectangularly shaped aperture therethrough, said cup shaped insulator positioned in said housing axial bore with said electrode extending through said end wall aperture thereby insulating said electrode from said housing, means to secure said insulator in said housing bore in nonrotatable relation thereto, a reel having a hub portion rotatably positioned on said housing, a second conductor having a portion connected to said reel and an end portion extending into said reel hub portion, a rotary electrode secured to said second conductor end portion, a second cup shaped insulator having an open end portion and a radial flange, said rotary electrode positioned in said second cup shaped insulator thereby insulating said reel from said rotary electrode, means to secure said radial flange to said reel hub portion for rotation of said insulator with said reel hub portion, and means urging said rotary electrode axially against said stationary electrode to maintain contact therebetween.

7. A rotary current collector as set forth in claim 6 which includes an annular plate positioned between said housing end wall and said reel hub portion, means maintaining said plate in nonrotatable relation to said housing, and means urging a surface of said plate into abutting relation with a mating annular surface of said reel hub, said annular plate being spaced from said stationary electrode, and shunt means connected to said plate and to said housing end wall.

8. A rotary current collector for maintaining contact between a rotary portion and a stationary portion of a conductor comprising a fixed housing having an axial cylindrical bore therethrough, a cylindrical outer wall, and an annular end wall, a stationary conductor extending into said bore, an elongated electrode connected to the end of said conductor, said electrode having a rectangular cross section and a conically shaped end portion, a cup shaped insulator having a cylindrical side wall and an end wall, said end wall having a rectangular aperture therethrough, said cup shaped insulator positioned in said cylindrical bore with said elongated electrode conical end portion extending through said end wall aperture so that said electrode is insulated from said housing, means to limit axial movement of said electrode in said housing bore, a reel having a hub portion rotatably secured to said housing cylindrical outer wall, roller bearing means between said reel hub portion and said housing outer wall, said hub portion having an axial bore therethrough, a second conductor having a portion connected to said reel and an end portion extending into said hub portion axial bore, a cylindrical rotary electrode having an end wall with a conically shaped recess therein and a planar other end wall, said second conductor end portion secured to said rotary electrode planar end wall and extending radially therefrom, a second cup shaped insulator having a cylindrical side wall, an end wall, and a radial flange adjacent one end, said cylindrical side wall having an elongated slot, said cylindrical rotary electrode positioned in said second cup shaped insulator with said second conductor extending through said slot and said conically recessed end wall abutting said elongated electrode conical end portion, and spring means between said rotary electrode and said second cup shaped insulator end wall urging said rotary electrode against said elongated electrode, and means securing said second cup shaped insulator to said reel hub portion for rotation therewith.

9. A cable reeling mechanism for supplying power to a vehicle comprising a reel support having a cylindrical outer wall, an axial bore and an annular end wall, said outer wall having an annular shoulder portion in spaced relation to said annular end wall, an annular roller bearing having an outer race and an inner race, said bearing positioned on said reel support outer cylindrical wall with said inner race abutting said shoulder portion, a cup shaped bearing retainer positioned over said reel support cylindrical outer wall and having its annular end wall abutting said bearing inner race to maintain said bearing inner race nonrotatably secured to said reel support, means securing said bearing retainer to said reel support, a cable reel having a hub portion with a cylindrical bore and an annular shoulder portion adjacent one end, said reel hub portion positioned on said reel support cylindrical outer wall with said shoulder portion abutting said bearing outer race, a ring member having a cylindrical inner wall positioned on said reel support in rotatable relation thereto, said ring member having an inwardly extending portion abutting said bearing outer race, and means securing said ring member to said reel to thereby rotatably support said reel member on said reel support.

10. A cable reeling mechanism for supplying power to a vehicle comprising a pair of reels rotatably mounted in vertical spaced relation on the frame of said vehicle, each of said reels adapted to have a single conductor cable wound thereon, said reels each having a hub portion, fixed current conductors within said hub portion, current collector means adapted to connect one end portion of the single conductor cable to said fixed current collector, said reels positioned in adjacent parallel spaced relation to each other and each having associated therewith a separate fluid motor for controlling the rotation of said reels so that said reels are rotatable relative to each other, each of said reels having a sprocket member secured thereto, said reels positioned in parallel spaced relation to each other with both of said sprockets therebetween, said fluid motors having drive sprockets associated therewith, a pair of endless chains drivingly connecting said reel sprockets to said fluid motor drive sprockets, and cable guide means on said vehicle adapted to maintain said cables in spaced relation to each other adjacent to said vehicle.

References Cited in the file of this patent
UNITED STATES PATENTS

| | | |
|---|---|---|
| 821,317 | Sessions | May 22, 1906 |
| 1,123,602 | Sessions | Jan. 5, 1915 |
| 1,160,857 | Coseo | Nov. 16, 1915 |
| 1,178,881 | Sessions | Apr. 11, 1916 |
| 1,620,231 | Richardson | Mar. 8, 1927 |
| 1,742,012 | Sloane | Dec. 31, 1929 |
| 1,970,604 | Henry | Aug. 21, 1934 |
| 1,976,516 | Renshaw et al. | Oct. 9, 1934 |
| 2,074,305 | Tornbloom | Mar. 16, 1937 |
| 2,090,707 | Sloane | Aug. 24, 1937 |
| 2,194,620 | Sekyra | Mar. 26, 1940 |
| 2,450,257 | Simmons | Sept. 28, 1948 |
| 2,750,153 | Lindgren | June 12, 1956 |
| 2,919,420 | Snodgrass et al. | Dec. 29, 1959 |
| 2,969,437 | Rayburn | Jan. 24, 1961 |
| 3,106,366 | Bernard | Oct. 8, 1963 |

FOREIGN PATENTS

| | | |
|---|---|---|
| 253,408 | Italy | June 14, 1927 |